United States Patent
Hernandez et al.

(10) Patent No.: US 11,262,001 B1
(45) Date of Patent: Mar. 1, 2022

(54) VENT COVER WITH INTEGRATED DRAIN TUBE ATTACHMENT

(71) Applicant: Dometic Sweden AB, Solna (SE)

(72) Inventors: Caleb Hernandez, Niles, MI (US); Mark Raymond Fazi, Osceola, IN (US)

(73) Assignee: Dometic Sweden AB, Solna (SE)

( * ) Notice: Subject to any disclaimer, the term of this patent is extended or adjusted under 35 U.S.C. 154(b) by 397 days.

(21) Appl. No.: 16/198,049

(22) Filed: Nov. 21, 2018

Related U.S. Application Data (60) Provisional application No. 62/589,962, filed on Nov. 22, 2017.

(51) Int. Cl.
| | |
|---|---|
| *F16L 55/07* | (2006.01) |
| *F16L 15/00* | (2006.01) |
| *F24F 13/22* | (2006.01) |
| *F24F 13/08* | (2006.01) |
| *F16L 3/26* | (2006.01) |
| *B60P 3/32* | (2006.01) |

(52) U.S. Cl.
CPC ............... *F16L 3/26* (2013.01); *F16L 15/00* (2013.01); *F16L 55/07* (2013.01); *B60P 3/32* (2013.01); *F24F 13/082* (2013.01); *F24F 13/22* (2013.01)

(58) Field of Classification Search
CPC ....... F16L 15/00; B06P 3/32; F24F 2013/227; F24F 2221/52; F24F 13/224; F24F 13/225; F24F 13/227; F24F 13/084; F24F 13/085; F24F 13/087; F24F 13/088; B60H 1/3233; B60H 1/26; B60H 1/262; B60H 1/265; B60H 1/267; F25D 21/14

USPC ......................................................... 454/147
See application file for complete search history.

(56) References Cited

U.S. PATENT DOCUMENTS

| | | | | |
|---|---|---|---|---|
| 4,067,206 | A * | 1/1978 | Smith | B05B 3/022 |
| | | | | 261/84 |
| 5,727,998 | A * | 3/1998 | Krueger | B60H 1/26 |
| | | | | 454/143 |
| 6,138,424 | A * | 10/2000 | Akerson | F24F 13/082 |
| | | | | 454/279 |
| 2003/0017798 | A1 * | 1/2003 | Hanaya | B62D 25/105 |
| | | | | 454/147 |
| 2005/0092009 | A1 * | 5/2005 | Thurman | F24F 13/222 |
| | | | | 62/289 |
| 2008/0104989 | A1 * | 5/2008 | Movshovitz | F24F 1/04 |
| | | | | 62/291 |
| 2008/0207112 | A1 * | 8/2008 | Michieli | F24F 13/082 |
| | | | | 454/330 |
| 2009/0031746 | A1 * | 2/2009 | Kelly | F24F 13/222 |
| | | | | 62/275 |
| 2009/0093208 | A1 * | 4/2009 | Yang | B60H 1/246 |
| | | | | 454/275 |

(Continued)

*Primary Examiner* — Steven B McAllister
*Assistant Examiner* — Charles R Brawner
(74) *Attorney, Agent, or Firm* — Middleton Reutlinger (57) ABSTRACT

The present embodiments provide a vent cover with an integrated drain tube attachment. The vent cover provides a structure for fastening or attaching a drain tube and guiding condensate from behind the vent cover in a controlled fashion. The structure is provided on a cover for connection of a drain tube rather than allowing the drain tube to simply float behind the cover. This positioning allows for controlled drainage in a manner that is preselected and retains the drain tube in a desired position.

17 Claims, 13 Drawing Sheets

(56) References Cited

U.S. PATENT DOCUMENTS

| | | | |
|---|---|---|---|
| 2010/0159821 A1* | 6/2010 | Bredahl | F24F 13/082 |
| | | | 454/358 |
| 2016/0272050 A1* | 9/2016 | Shigematsu | F16L 5/027 |
| 2016/0341442 A1* | 11/2016 | Murray | F24F 13/082 |
| 2018/0220555 A1* | 8/2018 | Schmidt | H05K 7/20272 |
| 2019/0145654 A1* | 5/2019 | Bryant | F16L 57/005 |
| | | | 138/96 R |
| 2020/0061532 A1* | 2/2020 | Yoon | F24F 1/0083 |
| 2020/0238794 A1* | 7/2020 | Matsushita | B60H 1/00571 |

\* cited by examiner

VENT COVER WITH INTEGRATED DRAIN TUBE ATTACHMENT

CLAIM TO PRIORITY

This non-provisional patent application claims priority to and benefit of, under 35 U.S.C. § 119(e), U.S. Provisional Patent Application Ser. No. 62/589,962, filed Nov. 22, 2017 and titled "Vent Cover with Integrated Drain Tube Attachment", all of which is incorporated by reference herein.

BACKGROUND

1. Field of the Invention

Present embodiments relate to a vent cover. More specifically, present embodiments relate to, without limitation, a vent cover having a drain tube attachment to allow controlled drainage of condensate from behind the vent cover.

2. Description of the Related Art

Many recreational vehicles utilize mechanicals to provide various desirable functions during camping and travel trips. Some types of mechanicals create condensation as part of their normal function. This condensation, if not routed from a recreational vehicle (RV), can cause damp conditions or worse, lead to mold contamination.

It would be desirable to manage condensation created by mechanicals within the RV. It would be desirable to use a structure which is near the mechanicals to aid in managing the condensation.

The information included in this Background section of the specification, including any references cited herein and any description or discussion thereof, is included for technical reference purposes only and is not to be regarded subject matter by which the scope of the invention is to be bound.

SUMMARY

The present application discloses one or more of the features recited in the appended claims and/or the following features which alone or in any combination, may comprise patentable subject matter.

The present embodiments provide a vent cover with an integrated drain tube. The vent cover provides a structure for fastening or attaching a drain tube and guiding condensate out from behind the vent cover in a controlled fashion. The structure is provided on a cover for connection of a drain tube rather than allowing the drain tube to dangle or otherwise move in an uncontrolled manner behind the cover. This positioning allows for controlled drainage in a manner that is preselected and retains the drain tube in a desired position.

According to some embodiments, a vent cover for a recreational vehicle comprises a peripheral wall defining a boundary, at least one cover surface extending between edges of the peripheral wall, at least one vent aperture disposed in the at least one cover surface adjacent to a recess, a grate extending from a rear side of the cover; and, a drain attachment disposed adjacent to the grate on the rear side of the cover.

Optional features may be utilized with these embodiments either alone or in combinations. For example, the drain attachment may have a slot. The slot may be oriented downward toward the grate. The drain attachment may have a C-shaped cross-section. The vent cover may further comprise at least one closure located on the at least one cover surface. The drain attachment may have a retention feature. The retention feature of the drain attachment may be a tapered sidewall. The retention feature of the drain attachment may be fastening threads. Further, the fastening threads may be on one of an interior surface or an exterior surface of the drain attachment.

In some embodiments, the drain attachment may be oriented horizontally. Further, the drain attachment may be disposed above the grate. Alternatively, the drain attachment may be oriented vertically. The drain attachment may be disposed above the recess formed in the at least one cover. The vent cover may further comprise at least one retention feature including barbs. The vent cover may further comprise an abutment disposed near a base of the drain attachment.

According to still further embodiments, a vent cover for a recreational vehicle may comprise a peripheral wall defining a boundary, at least one cover surface extending between edges of the peripheral wall, at least one vent cover aperture in the at least one cover surface, a recess defined adjacent to the at least one vent cover aperture, a grate extending from a rear surface of the at least one cover and, a drain tube attachment which allows passage of liquid from a rear side of the at least one cover to a front side of the at least one cover.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. All of the above outlined features are to be understood as exemplary only and many more features and objectives of the various embodiments may be gleaned from the disclosure herein. Therefore, no limiting interpretation of this summary is to be understood without further reading of the entire specification, claims and drawings, included herewith. A more extensive presentation of features, details, utilities, and advantages of the present invention is provided in the following written description of various embodiments of the invention, illustrated in the accompanying drawings, and defined in the appended claims.

BRIEF DESCRIPTION OF THE DRAWINGS

In order that the embodiments may be better understood, embodiments of a vent cover with an integrated drain tube will now be described by way of examples. These embodiments are not to limit the scope of the claims as other embodiments of a vent cover with drain tube attachment will become apparent to one having ordinary skill in the art upon reading the instant description. Non-limiting examples of the present embodiments are shown in figures wherein:

DETAILED DESCRIPTION

It is to be understood that vent cover with an integrated drain tube is not limited in its application to the details of construction and the arrangement of components set forth in the following description or illustrated in the drawings. The described embodiments are capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Referring now to FIGS. 1-13, present embodiments provide a vent cover with drain tube attachment which allows for controlled positioning and retention of a condensate drain tube and connection of the drain tube. The connection of the condensate on the rear of the vent cover provides controlled condensate drainage at a preselected position and either above a grate or connected to other structures extending from the rear surface of the vent cover. This allows for drainage at a preselected position and in a manner which is controlled rather than simply allowing a dangling tube.

Figure 1:
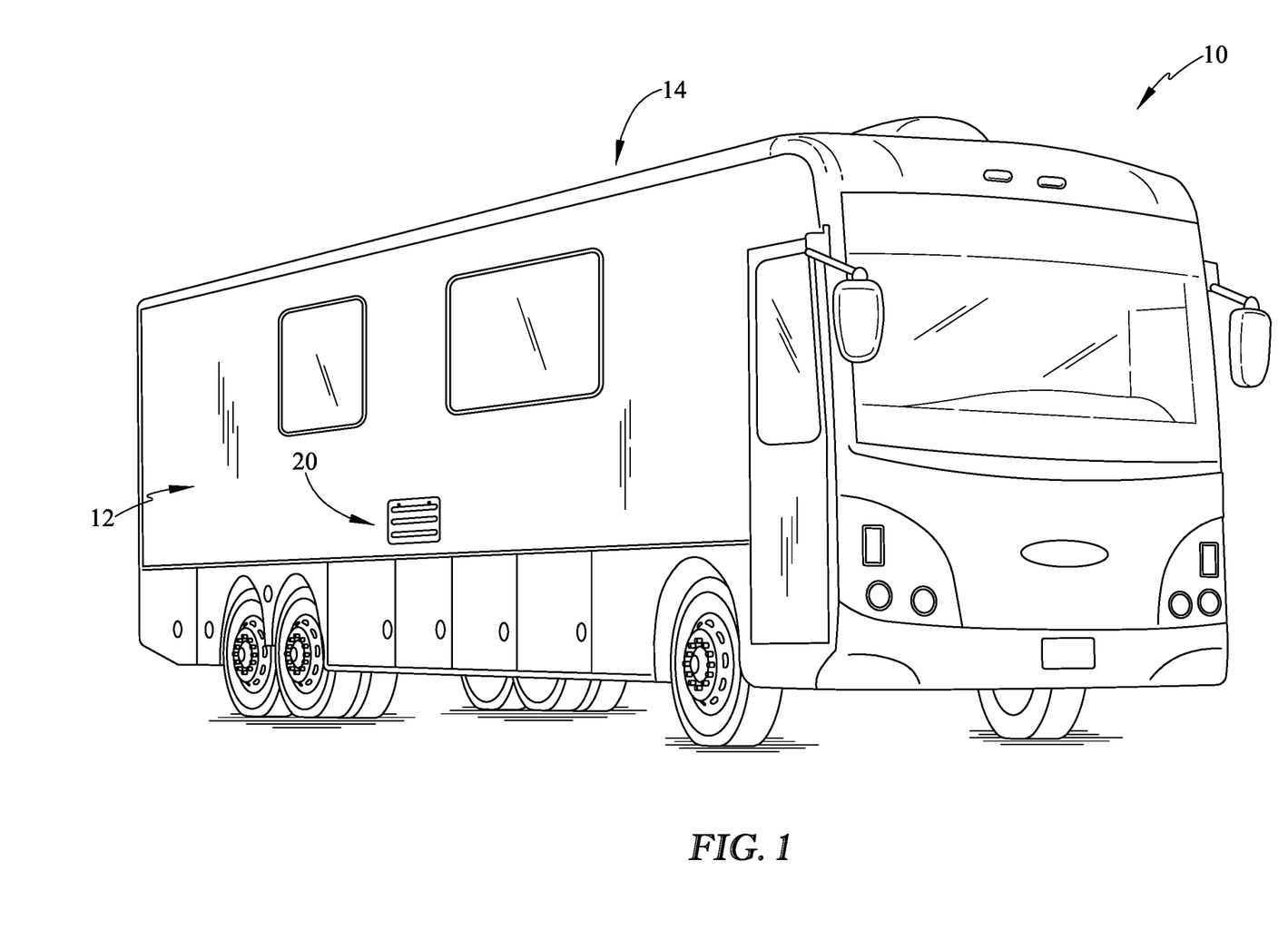
FIG. 1 is a perspective view of a recreational vehicle (RV) having a vent cover.

Referring now to FIG. 1, a recreational vehicle (RV) 10 is provided which may utilize a vent cover at a location opposite a refrigerator, furnace, water heater, HVAC or other mechanism which releases heat, and therefore needs ventilation, and/or may be adjacent a source of condensate drainage. The RV may be a towable or may be a coach class, inclusive of an engine (not shown) for powering its movement.

The RV 10 may be a motor coach as depicted having an engine for powered movement. The RV 10 may have a frame, sidewalls, a roof and optionally a propulsion system and cockpit. The exemplary RV 10 includes a drive and a transmission for propulsion, not shown, as well as the least one sidewall 12 and the roof 14. It should be understood that although an RV is referred to in the exemplary embodiments, one skilled in the art should understand that the use of the vent cover is not limited to these drivable vehicles. The term "RV" is also meant to include towable structures, sometimes called campers, homes and other stationary structures as well as boats or other marine applications for example which use canopy structures which may or may not be retractable, commercial vehicles, agricultural vehicles, horse trailers, and temporary structures such as those used at sports events, (tailgating), flea markets. All of these structures are considered to be recreational vehicles and usable with the present embodiments.

The RV 10 may also have multiple mechanical systems which may generate heat, such as water heater, furnace, refrigerator/freezer, and the like which require ventilation simply to reduce heat or to ventilate combustion air. Any of these, or other types of mechanicals may benefit by having a vent cover 20 which is located in a sidewall of the RV 10.

Additionally, the mechanicals listed above or other mechanicals may create condensation which requires drainage from the RV 10. The vent cover 20 may also be utilized to control the removal of condensation from the RV 10. In some embodiments, the vent cover 20 may include structure for retaining condensation drain(s) and condensate for further evaporation.

Figure 2:
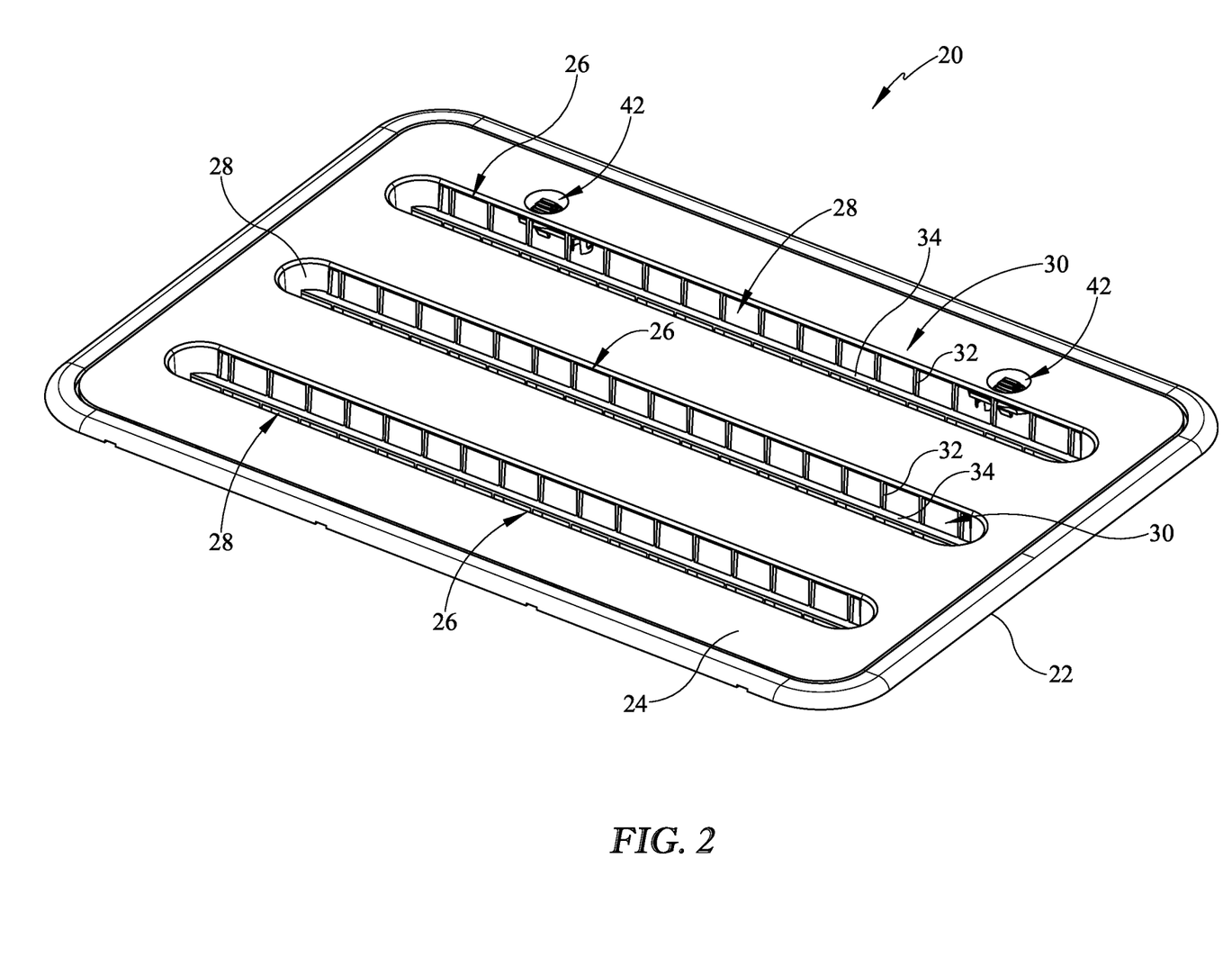
FIG. 2 is a perspective view of the vent cover of FIG. 1.

Referring now to FIG. 2, a perspective view of the vent cover 20 is depicted. The vent cover 20 is shown in a generally horizontal position but may be mounted in a generally vertical orientation as shown in FIG. 1 and on any side of the RV 10. The vent cover 20 is shown in a horizontal orientation in this view merely for ease of viewing of a portion of the vent cover 20 which may not be clearly viewable when vertically oriented.

The vent cover 20 comprises a peripheral wall 22 which may be linear or may be curved, as depicted. That is, extending from the rear to the front surface of the vent cover, the peripheral wall 22 may be linear, curved or combinations thereof. The peripheral wall 22 may also define the shape of the vent cover 20. For example, the vent cover 20 may be various shapes and according to the instant embodiments the vent cover 20 is generally rectangular with corners that are curved. However, other shapes may be utilized for the vent cover 20 depending on the opening formed in the RV 10 or other factors which may determine a desired shape. The overall shape therefore may be one or more wall segments to define the sides of the rectangular or other geometrical shape. The shape of the vent cover 20 may be considered a single wall or may be more than one wall.

Extending within the peripheral wall 22 is a cover surface 24 or cover plate. The cover surface 24 or cover plate defines a front face of the vent cover 20 and may be formed of various colors, textures, materials, and/or combinations thereof.

The cover surface 24 also includes at least one vent aperture 26. The at least one vent aperture 26 is shown as multiple vent apertures in the instant embodiment. Each of the vent apertures 26 also defines a recess 28 extending into the cover surface 24. The recess 28 may be open at the top and behind the cover surface 24 when the vent cover 20 is oriented vertically. Further, the lower portion of the recess 28, and rearward of the surface 24, may have a surface so that any materials passing through the upper openings falls into the recess 28 and are guided out to the outer or front side of the vent cover 20.

With the vent cover 20 shown in the horizontal orientation, upper areas of each recess 28 may be seen. The openings of the upper part of each recess 28 are defined by a grate 30. The grate 30 may be defined by multiple segments 32, 34 of material which may criss-cross in perpendicular or angled fashion and provide some rigidity while maintaining an upper opening. The criss-crossing segments 32, 34 may have various cross-sectional shapes and may vary in size depending upon the desired opening size and the desired rigidity or strength for the vent cover 20.

Figure 3:
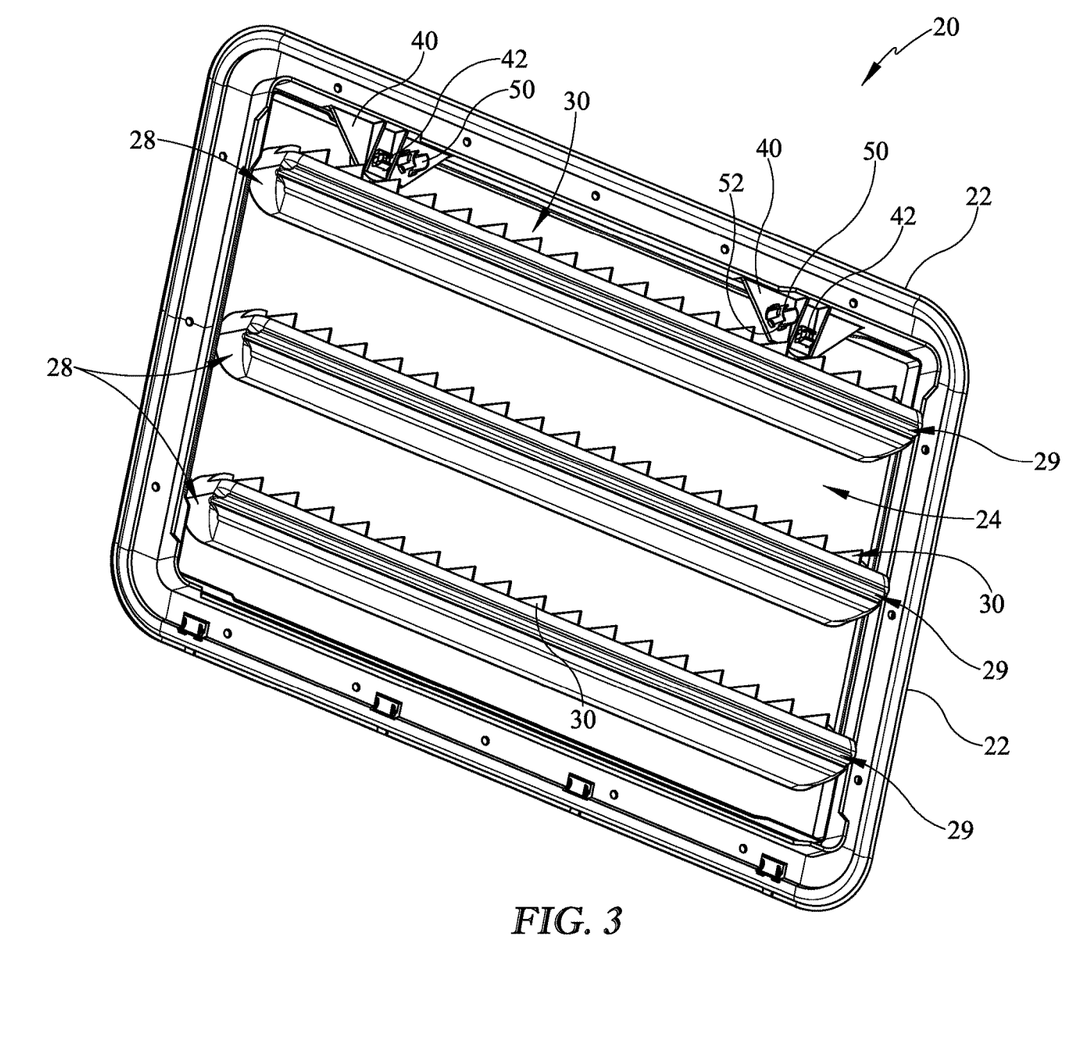
FIG. 3 is a rear perspective view of one embodiment of a vent cover.

Referring now to FIG. 3, a rear perspective view of the vent cover 20 is depicted. In this view, the peripheral wall 22 is shown with a rear side of the cover surface 24. In this view, the rear view also depicts the structure defining the recesses 28. Each of the vent apertures 26 (FIG. 2) comprises a lower guide surface which extends outwardly and upwardly from the rear of the cover surface 24. The tops of each of these recesses 28 is open. The grate 30 is positioned in this upper opening.

At the top of the vent cover 20 are fastener frames 40. These frames 40 provide a mounting position for a closure 42. Each of the closures 42 allows for closure and locking of the vent cover 20 to the RV 10. The closure 42 are also shown, with additional reference to FIG. 2, and may comprise a keyed structure, a bolted fastener or other structure which may be easily locked and unlocked or closure by the user, for non-limiting example by rotation from a first position to a second position.

Extending from the fastener frames 40 are the drain tube attachments 50. Alternatively, the drain tube attachments 50 may extend from the rear surface of cover surface 24 or other location behind the cover surface 24. Further, the vent cover 20 may include one or more drain attachments 50. The instant embodiment is shown with two attachments 50. The number of attachments 50 may be dependent upon the number of mechanical systems which create condensate and which may be necessary for management of such.

Each drain tube attachment 50 extends from the rear side of the vent cover 20 and connects with a drain tube (not shown) from an RV mechanical which produces condensate. Specifically, according to some embodiments, the drain tube attachments 50 may extend from frames 40. The connection of the tube to the drain tube attachment 50 provides for guided movement of the condensate to a desired position rather than allowing for the tube to dangle or float behind the vent cover 20.

The drain tube attachment 50 is disposed above the grate 30 so that condensate falls downwardly through the grate 30 and into the recess 28. Because the bottom of the recess 28 is closed, any condensate falls into the opening of the vent aperture 26 (FIG. 2) and evaporates or may be conducted to another location for subsequent drainage.

The drain tube attachment 50 is generally circular in cross-section according to the instant embodiment with at least one slot 52. The slot allows condensate to fall from within the attachment 50 and downwardly into the grate 30. The drain attachment 50 is oriented downwardly. However, in other embodiments, other orientations and shapes for the attachment structure 50 may be utilized as will be shown in other embodiments.

Also shown in the rear view of the vent cover 20 are creases 29 which extend outwardly, from rear to front of the recess 28. On the opposite of side of recess 28, these features inhibit rain water from passing upwardly through the grate 30 and to the rear side of the vent cover 20.

Figure 4:
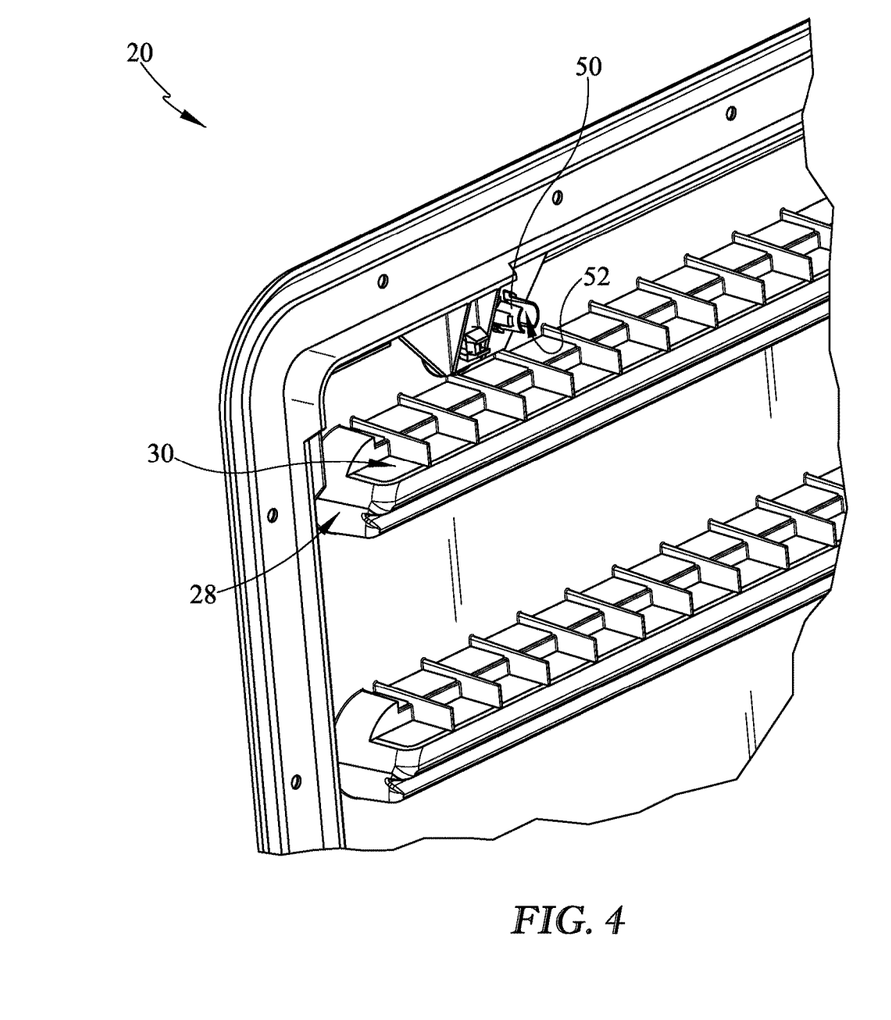
FIG. 4 is an upper rear perspective view of the vent cover, including the drain attachment.

Referring now to FIG. 4, an upper rear perspective view of the vent cover 20 is shown. In this view, the drain attachment tube 50 is shown extending from the fastener frame 40. In alternate embodiments, the drain attachment 50 may also extend from the rear surface of the rear cover surface 24. The drain attachment 50 is also shown having at least one slot 52, more clearly shown in this view. According to the instant embodiment, two slots 52 may be provided. The drain tube 60 (FIG. 5) may be positioned over the outside of the drain tube attachment 50 or within the interior of the attachment 50. The slots provide a space for liquid to exit the attachment, at a location near the end of the tube. From this position, water may fall through the grate 30.

In this view, the grate 30 is also more clearly shown. The grate 30 allows openings for air flow to ventilate the area behind the cover 20. This may be desirable for areas adjacent to refrigerators which use absorption systems and burn propane or furnaces, water heaters and the like which need to be ventilated for combustion. Still further, the positioning above the grate 30 allows for gravity feed of condensate liquid to move from the attachment 50 down through the grate 30 and into the recess 28.

Figure 5:
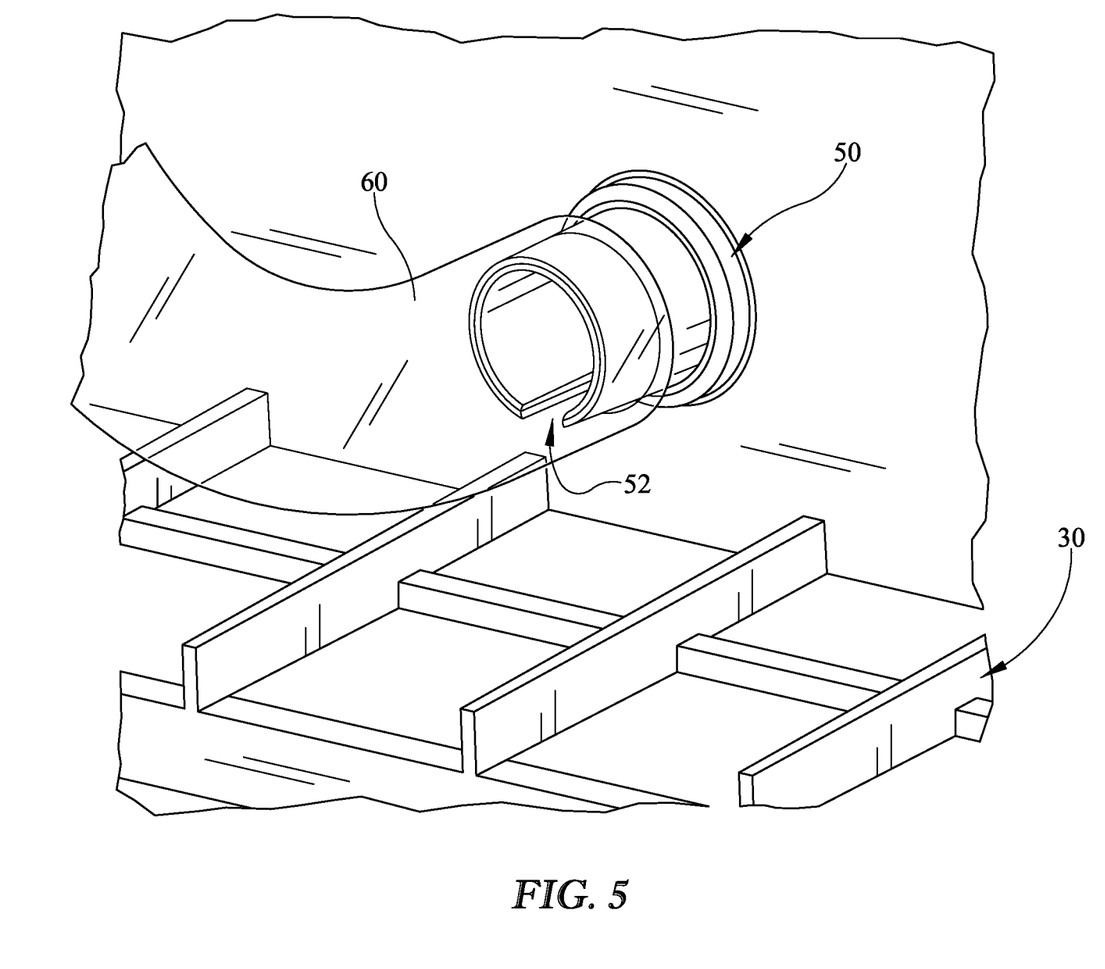
FIG. 5 is a detail perspective view of an embodiment of the drain tube attachment.

Referring now to FIG. 5, a detailed perspective view of an illustrative drain tube attachment 50 is shown. In this view, the attachment 50 is shown positioned above the grate 30 so that condensate drainage may fall through the grate 30 and into the recess 28 (FIG. 4) below where the condensate ultimately evaporates. The drain tube attachment 50 also is shown in this embodiment with a single slot 52 but may have additional slots. In this view an illustrative drain tube 60 is also shown. The tube 60 is shown as transparent merely for ease of seeing the attachment structure 50. However, other opaque or semi-opaque finishes may be utilized.

Figure 6:
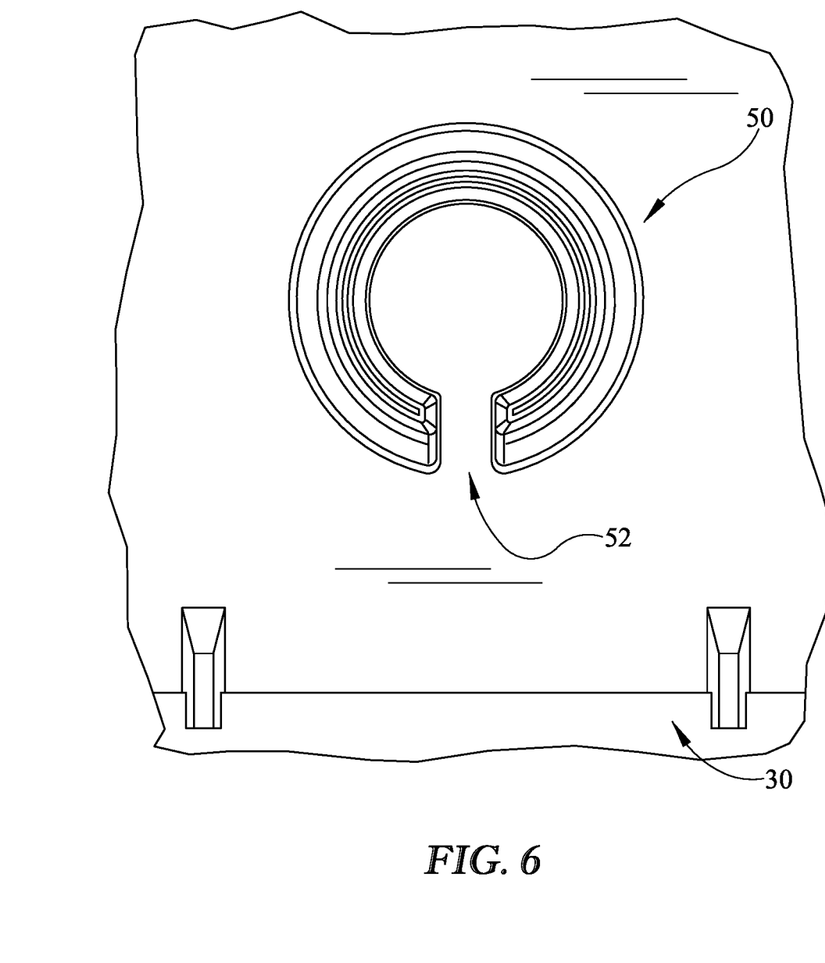
FIG. 6 is a front view of the drain tube attachment from the rear of the vent cover.

Referring now to FIG. 6, an end view of the drain tube attachment 50 is shown. In this view, the attachment 50 is generally circular in shape with the lower slot 52 allowing drainage downwardly toward the grate 30. The slot 52 is oriented downward so that the liquid falls through the slot 52 with gravity. Depending on the orientation of the vent cover 20 and the orientation of the drain attachment 50, the number of slots 52 and locations of the slots may vary. This structure may be straight walled, cylindrical shaped, or may be tapered to provide an interference fit. Further, the attachment 50 may utilize various types of retention features to retain the tube 60 on the attachment 50. Non-limiting examples of retention features may include barbs, teeth, ribs, threads, helical structures, other features or combinations.

Figure 13:
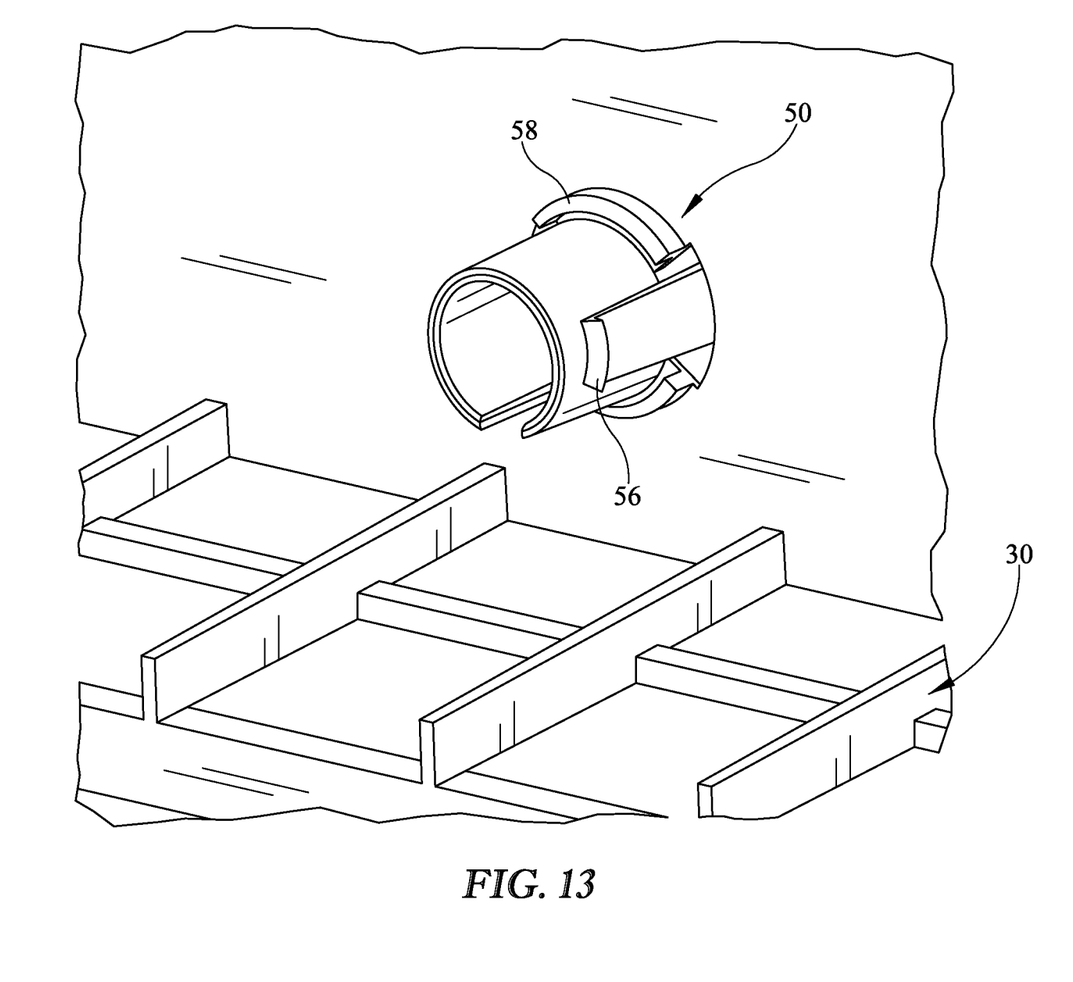

Further, with brief additional reference to FIG. 13, a further illustrative for the attachments is provided. Drain tube attachment 50 is shown having at least one type of retention feature 56 along the attachment 50. The tube 60 (FIG. 5) passes over the retention feature 56 and is retained on the attachment 50. In the instant embodiment, the attachment 50 may have two snap features 56. Each of these retention features may be a tooth or barb-like feature to allow application of the tube 60 but inhibit removal or backing off of the tube 60. The retention features 56 may extend from the attachment 50 or may extend from a distinct structure extending along or adjacent to the attachment 50.

The attachment 50 may further comprise an abutment 58 near the end of the attachment 50, beyond which the tube 60 cannot pass. Thus the tube 60 is retained on the attachment 50 but cannot slide beyond a preselected position. Accordingly, condensate may continue to drain from the attachment 50.

Figure 7:
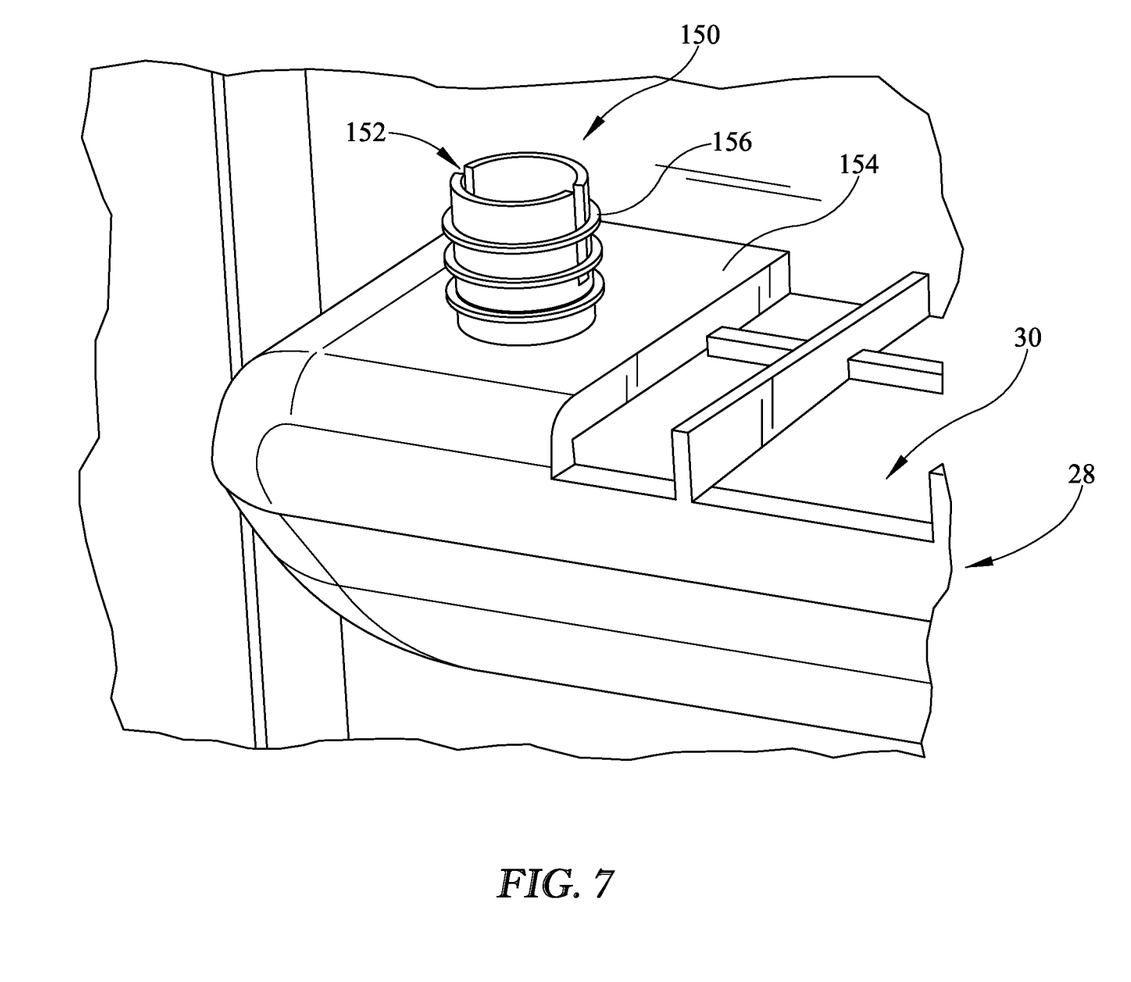
FIG. 7 is a perspective view of a further embodiment of a drain attachment for a vent cover.

Referring now to FIG. 7, an alternate embodiment is shown in perspective view. In this view, the drain tube attachment 150 is shown in a vertical orientation and may be molded integrally with the cover 20. The vertical orientation requires that a mounting surface 154 be provided to position of the drain tube attachment 150. This surface 154 is positioned adjacent to the grates 30 and above the recess 28.

The drain tube attachment 150 is also shown having threads 156 which may be circular or helical for either of interference engagement with a tube or alternatively threaded engagement.

The drain tube attachment 150 may also comprise at least one slot 152 extending vertically through the drain tube attachment to allow liquid to pass from the tube toward the grate 30. One skilled in the art should understand that the drain tube attachments may have an opening through the surface of the frame or a mounting surface, such as surface 154 through which water passes. Alternatively, the end of the drain tube may be closed, forcing liquid to pass through slots toward the grates 30. In still further alternatives, the interior of the drain tube attachment may be partially open/closed but may also have small drain holes rather than being fully opened.

Figure 8:
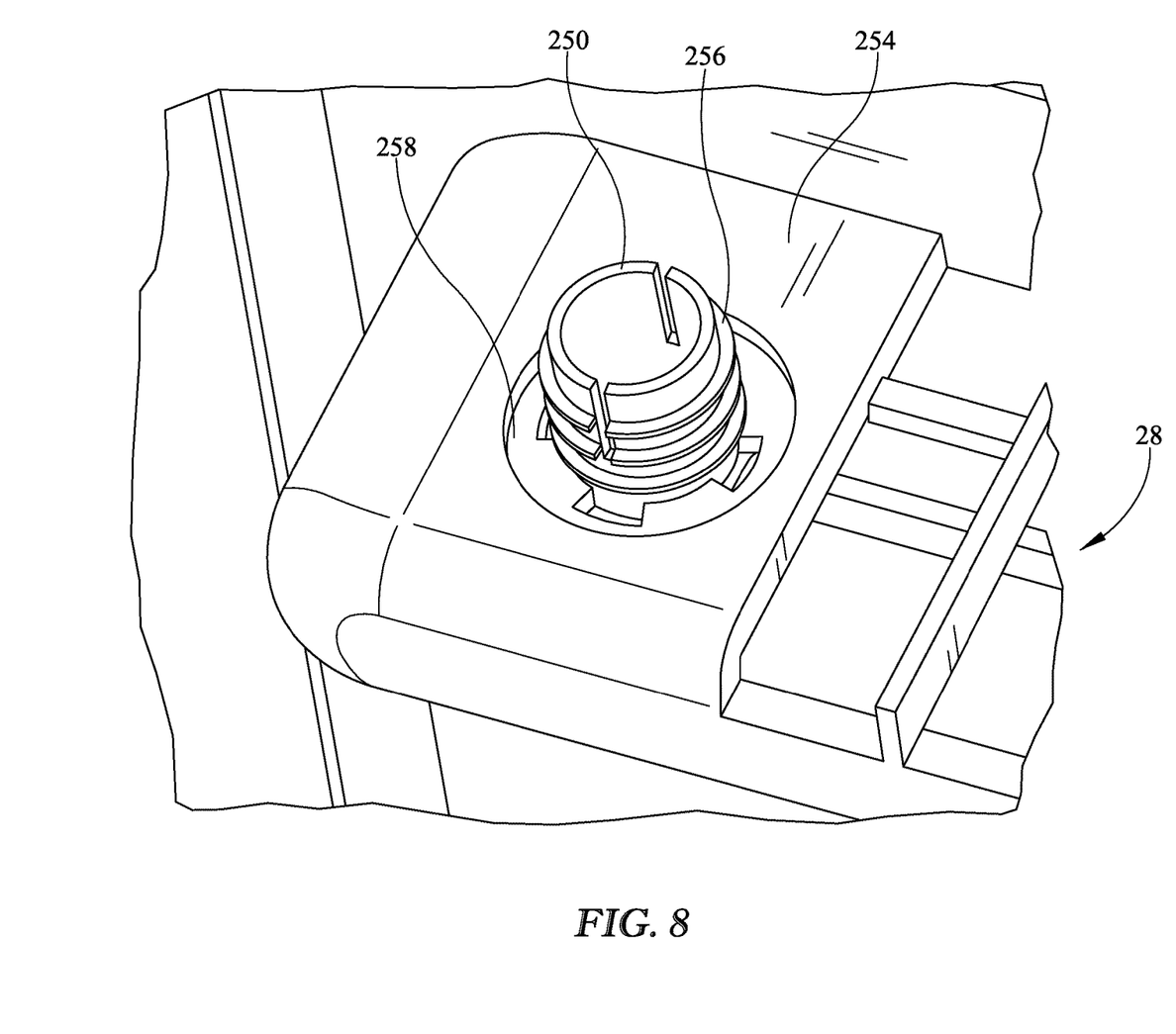
FIG. 8 is a perspective view of further embodiment of a drain attachment for a vent cover.

Referring now to FIG. 8, a further alternate embodiment, the drain tube attachment 250 is provided in a vertical orientation. This may be molded integrally with the cover 20 or may be formed separately and connected during manufacturing. As with the embodiments of FIG. 7, the present embodiment is also vertically oriented and also includes threads 256 disposed along the outer surface of the attachment 250 either defining interference ribs or helical threads for fastening. Other interference structures may be defined by the threads in this or any of the embodiments described herein. The surface 254 includes a recess 258 wherein the drain tube attachment 250 is positioned and the recess 258 may include at least one aperture to allow any condensate drainage to pool in the recess 258 before falling through into the lower recess 28.

Figure 9:
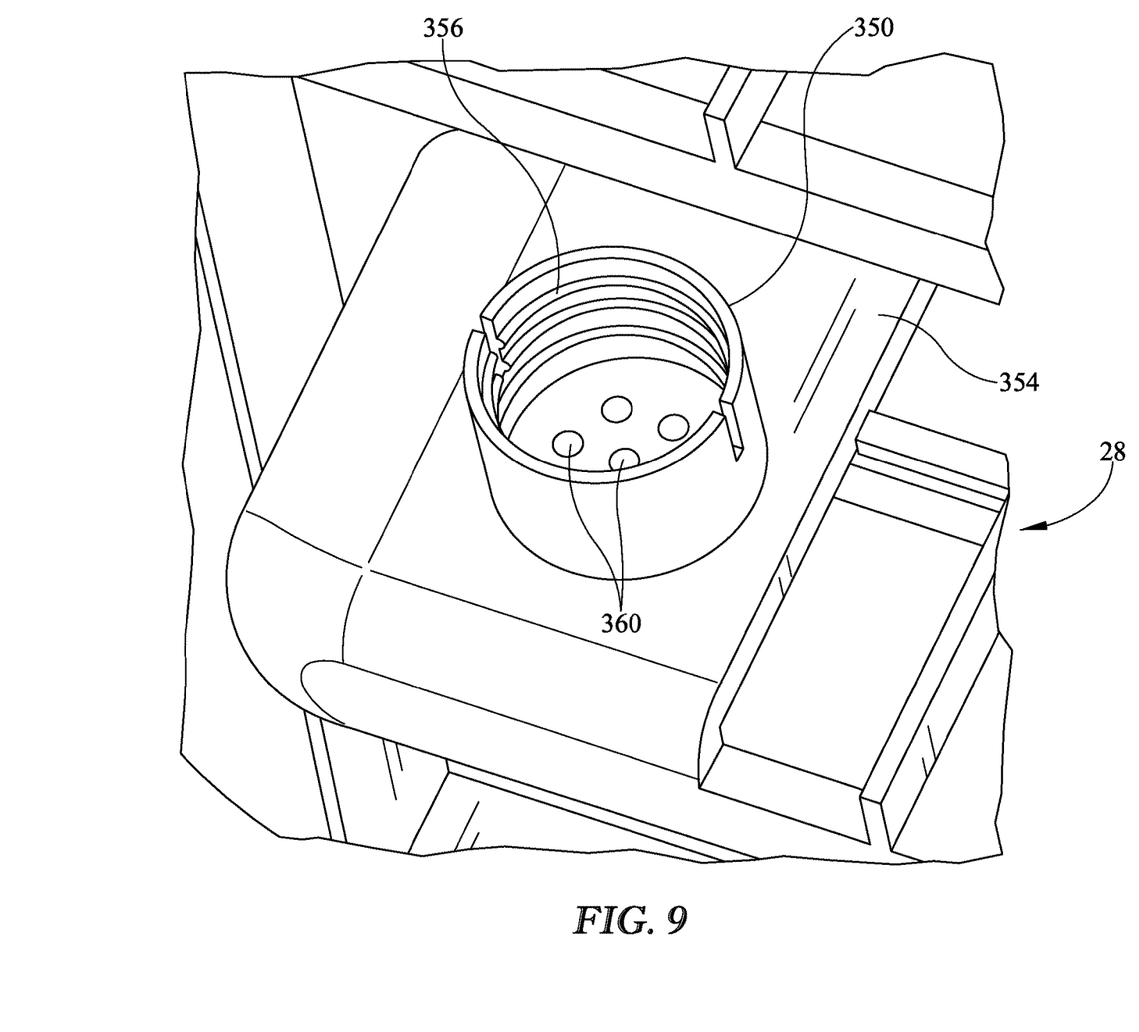
FIG. 9 is a perspective view of further embodiment of a drain attachment for a vent cover.

Referring now to FIG. 9, a further detailed perspective view is shown of a drain tube attachment 350 which may also be vertically oriented and may be molded with the cover 20. Further, the drain tube attachment 350 may include threads 356 internal to the attachment 350. Along a lower surface 354 from which the drain tube attachment 350 extends, may be multiple drain holes 360 which pass through to the recess 28 below. Thus, the structure may be solid filled, without apertures, or alternatively may have one or more apertures to allow the drainage there through. Further, while the drain attachments described thus far have been molded of formed integrally with the vent cover, they may also be formed separately and connected to the vent cover, such as by friction or interference fit, or by adhesive.

Figure 10:
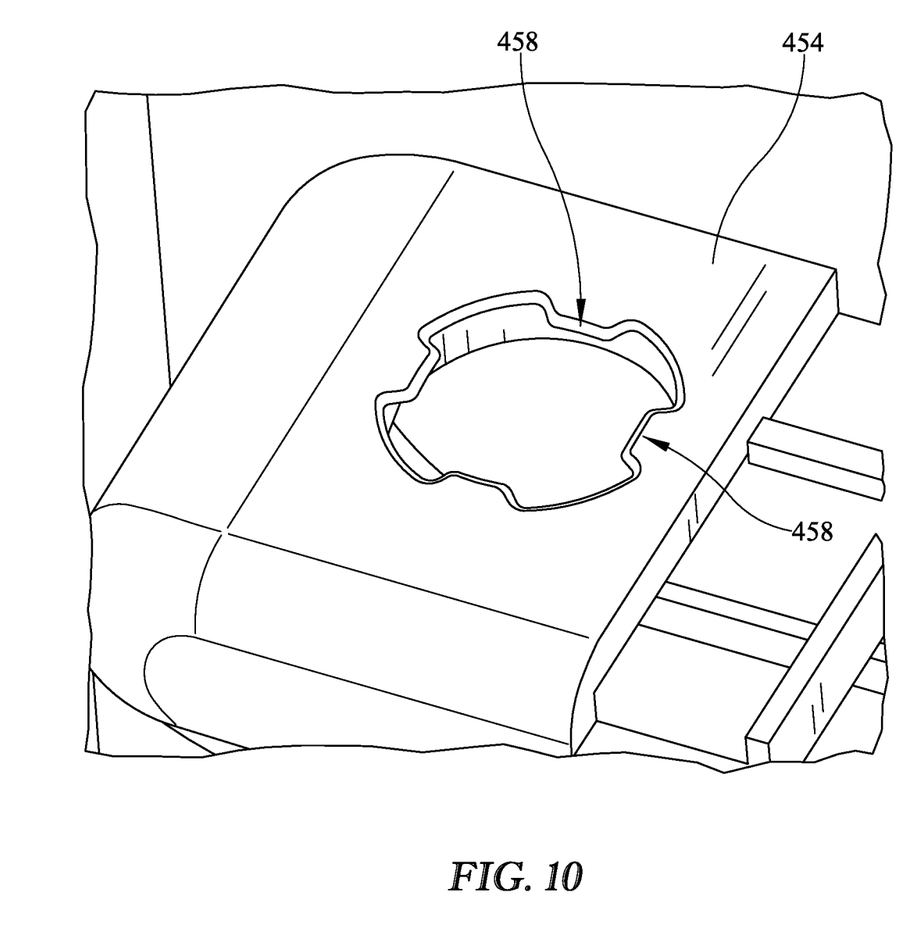
FIG. 10 is a perspective view of further embodiment of a drain attachment for a vent cover.
Figure 11:
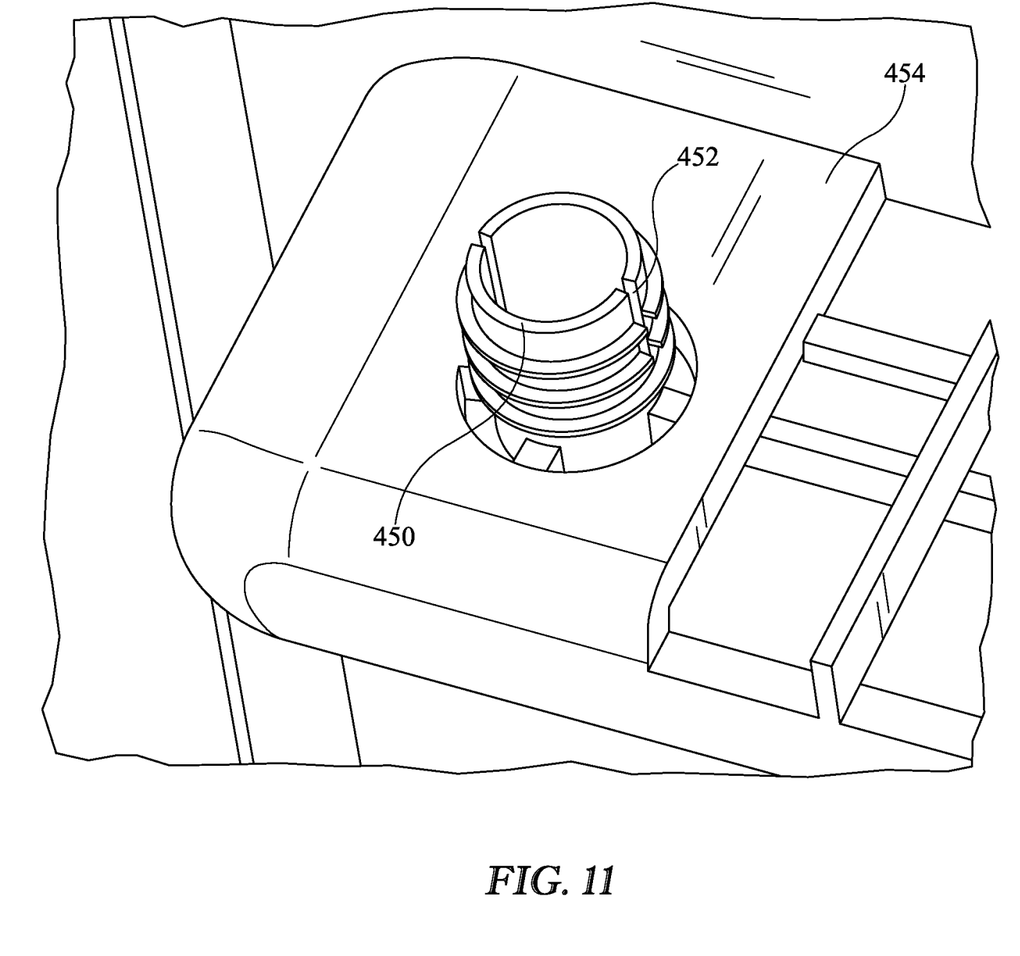
FIG. 11 is a perspective view of further embodiment of a drain attachment for a vent cover.

According to the embodiment of FIGS. 10 and 11, the hole in the surface 454 may be larger in size than that shown in FIG. 8 and the drain tube attachment 450 may frictionally fit by teeth 458 which extend from the surface 454 allowing passage through of fluid through the drain tube attachment 450 or alternatively, buildup of the fluid and drainage out by way of the slots 452. FIG. 11 shows a similar arrangement of differing shape and includes the drain tube attachment 450 positioned therein.

Figure 12:
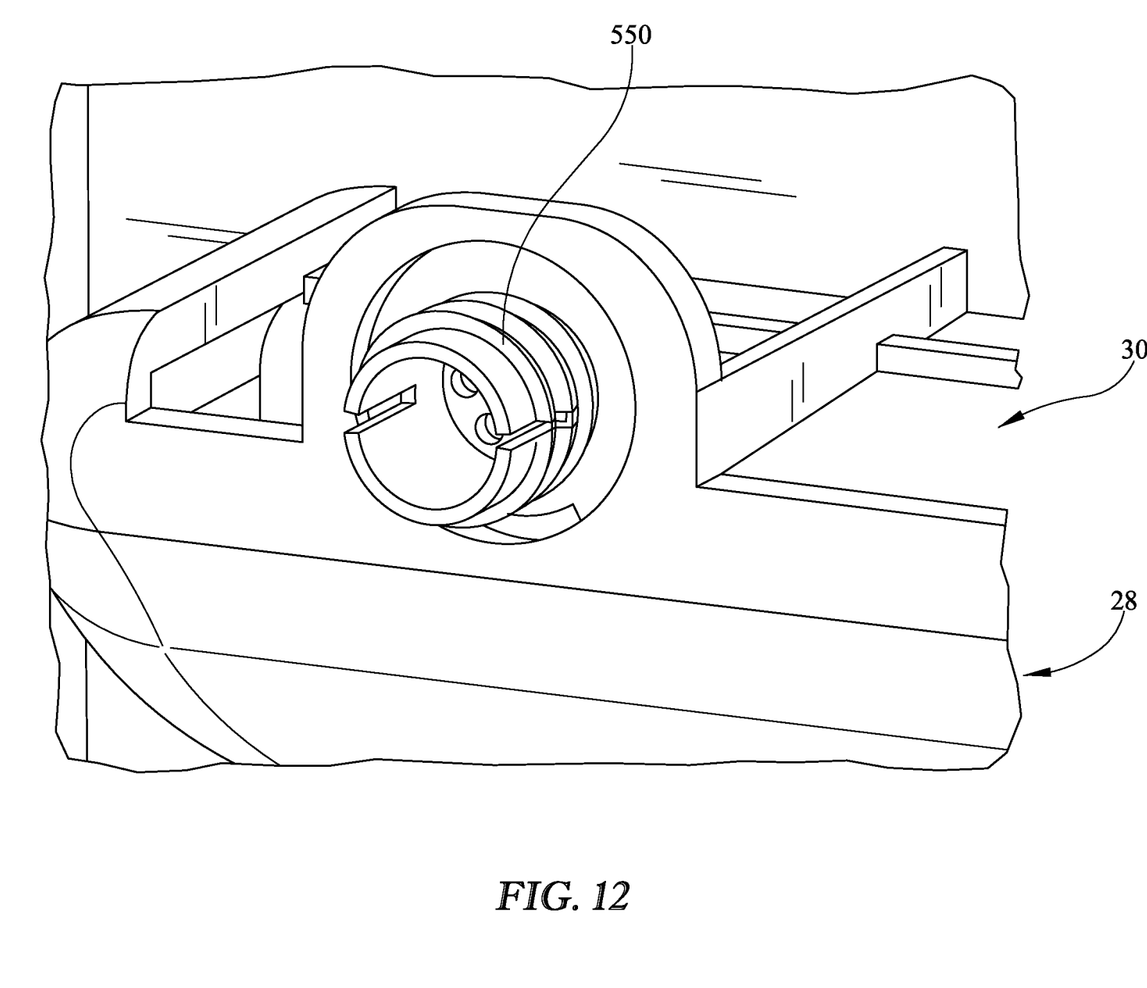
FIG. 12 is a perspective view of further embodiment of a drain attachment for a vent cover; and, FIG. 13 is a perspective view of a further embodiment of a drain tube attachment for a vent cover.

Further, these embodiments may also be formed using a drain tube in a horizontal orientation with either exterior or interior threads. With reference to FIG. 12, the embodiment provides a horizontally oriented drain tube attachment 550. The tube attachment 550 is elevated to a position above the grate 30. The interior of the tube may be fully open or have one or more smaller holes as shown. The liquid condensate may pass through the small holes and through the grate 30.

It should also be understood that any of these embodiments may be used in combination with others. For example, the attachments may be used at multiple elevations in order to distribute condensation to any of the recesses. Where the frames 40 (FIG. 3) are not available at lower elevations, it may be desirable to use alternative mounting configurations for the attachments, as taught in the alternative embodiments.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

The foregoing description of methods and embodiments has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

The invention claimed is:

1. A vent cover for a recreational vehicle, comprising:
 a peripheral wall defining a boundary;
 at least one cover plate extending between edges of said peripheral wall, said at least one cover plate having a front side and a rear side;
 at least one vent aperture disposed in said at least one cover plate adjacent to a recess;
 a grate extending from said rear side of the at least one cover plate; and,
 a drain attachment disposed above said grate on said rear side of said at least one cover plate, said drain attachment having a C-shaped cross-section.

2. The vent cover of claim 1 wherein said drain attachment has a slot.

3. The vent cover of claim 2, wherein said slot is oriented downward toward said grate.

4. The vent cover of claim 1 wherein said drain attachment comprises a tapered sidewall defining a retention feature.

5. The vent cover of claim 1 further comprising an abutment disposed near a base of said drain attachment.

6. A vent cover for a recreational vehicle, comprising:
 a peripheral wall defining a boundary;
 at least one cover plate extending between edges of said peripheral wall, said at least one cover plate having a front side and a rear side;
 at least one vent aperture disposed in said at least one cover plate adjacent to a recess;
 a grate extending from said rear side of the at least one cover plate;
 a drain tube attachment disposed above said grate on said rear side of said at least one cover plate, and,
 at least one closure located on said at least one cover plate.

7. The vent cover of claim 6 wherein said drain tube attachment comprises fastening threads defining a retention feature.

8. The vent cover of claim 7 wherein said fastening threads are on one of an interior surface or an exterior surface of said drain tube attachment.

9. The vent cover of claim 6 wherein said drain tube attachment is oriented horizontally.

10. The vent cover of claim 7 wherein said drain tube attachment is oriented vertically.

11. The vent cover of claim 9 wherein said drain tube attachment is disposed above the recess formed in said at least one cover plate.

12. The vent cover of claim 6 further comprising at least one retention feature including barbs.

13. A vent cover for a recreational vehicle, comprising: a peripheral wall defining a boundary; at least one cover plate extending between edges of said peripheral wall; at least one vent cover aperture in said at least one cover plate; a recess defined adjacent to said at least one vent cover aperture; a grate extending from a rear surface of said at least one cover plate; a drain tube attachment extending from said rear surface of said at least one cover plate and disposed above said grate which allows passage of liquid from a rear side of said at least one cover plate to a front side of at least one cover plate.

14. The vent cover of claim 13 wherein said drain tube attachment is oriented horizontally.

15. The vent cover of claim 13 wherein said drain tube attachment is oriented vertically.

16. The vent cover of claim 13 wherein said drain tube attachment comprises fastening threads defining a retention feature.

17. The vent cover of claim 13, wherein said drain tube attachment comprises a C-shaped cross-section.

* * * * *